United States Patent [19]

Cuba

[11] 4,290,504
[45] Sep. 22, 1981

[54] TREE-MOUNTED DEER STAND

[76] Inventor: Cary Cuba, 1 N. Bryant Blvd., San Angelo, Tex. 76903

[21] Appl. No.: 159,166

[22] Filed: Jun. 13, 1980

[51] Int. Cl.³ .............................................. A47C 7/62
[52] U.S. Cl. .................................... 182/187; 182/82; 182/129; 297/217; 108/151
[58] Field of Search ................. 182/187, 82, 129, 230; 108/151; 297/217

[56] References Cited

U.S. PATENT DOCUMENTS

| | | | |
|---|---|---|---|
| 1,759,966 | 5/1930 | Swinney | 182/187 |
| 1,823,385 | 9/1931 | Barker | 182/187 |
| 3,338,332 | 8/1967 | Brantly | 108/151 |
| 3,613,896 | 10/1971 | Miller | 182/187 |
| 3,749,200 | 7/1973 | Meyer | 182/187 |
| 3,863,736 | 2/1975 | McWilliams | 182/187 |
| 3,967,694 | 7/1976 | Woolfolk | 297/217 |
| 4,069,891 | 1/1978 | McClung | 182/187 |
| 4,150,733 | 4/1979 | Plummer | 182/187 |

*Primary Examiner*—Reinaldo Machado
*Attorney, Agent, or Firm*—Littlepage & Webner

[57] ABSTRACT

A frame has upwardly convergent legs which support a plate on which a seat is swiveled. The frame provides a socket which fits over the upper end of an upwardly disposed tree stump or limb stub. A foot rest extends around three sides of the frame so as to leave an open side through which the hunter may climb up to the seat. Clamps in the lower portion of the frame secure it to the tree member.

5 Claims, 4 Drawing Figures

TREE-MOUNTED DEER STAND

FIELD OF INVENTION

Fire escapes, ladders, scaffolds, scaffold external of shaft

PRIOR ART

U.S. Pats. to Brantley, Sr. No. 3,338,332; Meyer No. 3,749,200; McClung No. 4,069,891.

OBJECTS

Although many kinds of tree-mounted deer stands have been devised, so far as is known they entail structures by which a hunter is supported on one side of a tree trunk, thereby greatly limiting the scope of the hunter's vision and shooting. The primary object of this invention is to provide a tree mounted deer stand which provides 360° scope of vision and shooting.

A further object is to provide a tree-mounted deer stand by means of which the hunter is perched on top of a vertically disposed or upwardly inclined tree stump or limb stub. To this end it is proposed now to provide a portable frame which can easily be clamped onto a tree stump or limb stub, a chair swiveled on top of the frame for 360° rotation, and an outwardly extending foot rest which the hunter can reach with his feet at any angular position of the seat, while nevertheless leaving an opening at one side at whereby the hunter may climb up to the seat without having to climb over the foot rest.

Still another object is to provide clamps for firmly securing the frame onto a tree stump or limb stub, the frame being downwardly enlarged so that, by the means of a wedge or distance piece, the frame may be vertically affixed onto an upwardy inclined stump or stub.

These and other objects will be apparent in the following specification and drawings, in which FIG. 1 is a side elevation of the deer stand mounted on a tree stump or limb stub;

Figure 1:
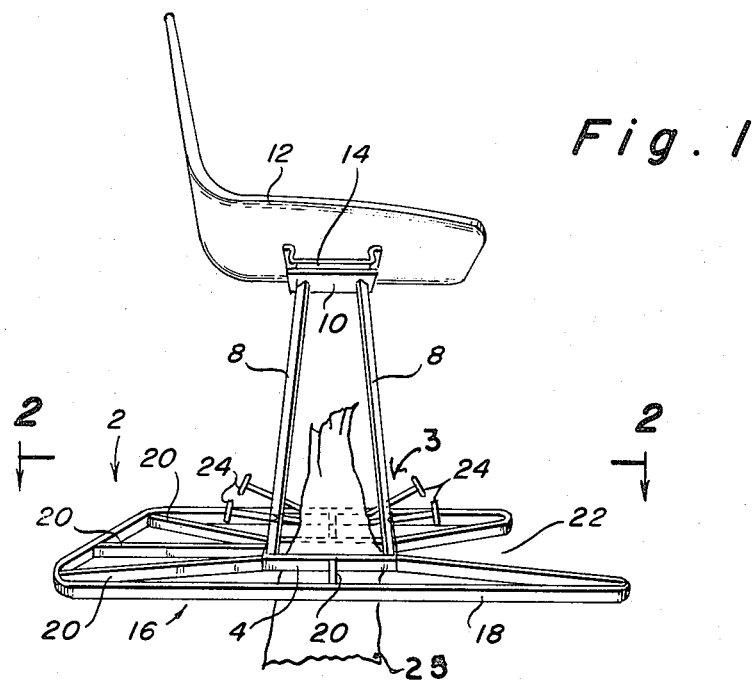
Figure 2:
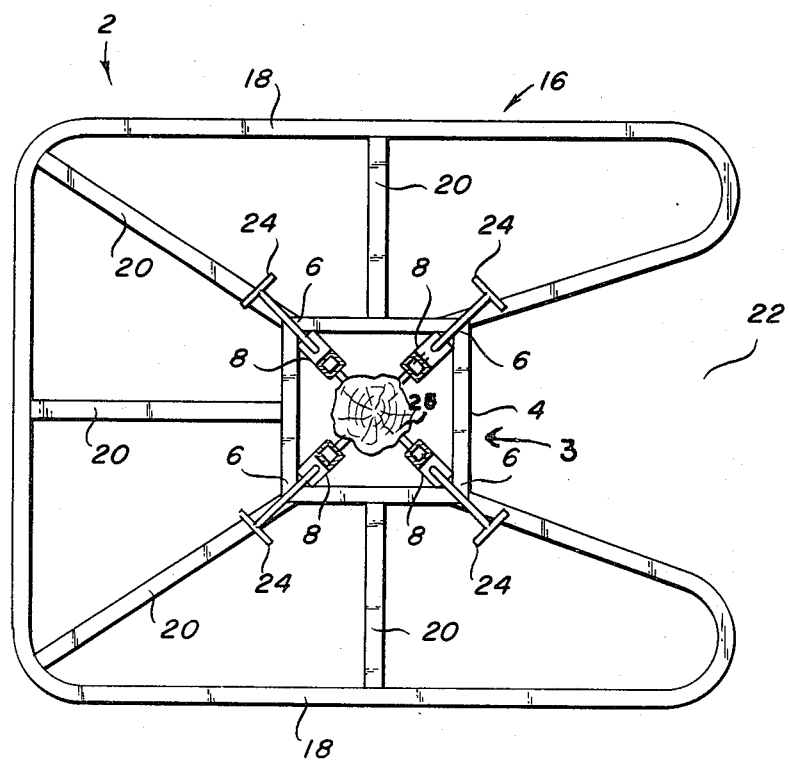
FIG. 2 is a cross-section along the lines 2—2 of FIG. 1, looking in the direction of the arrows.
Figure 3:
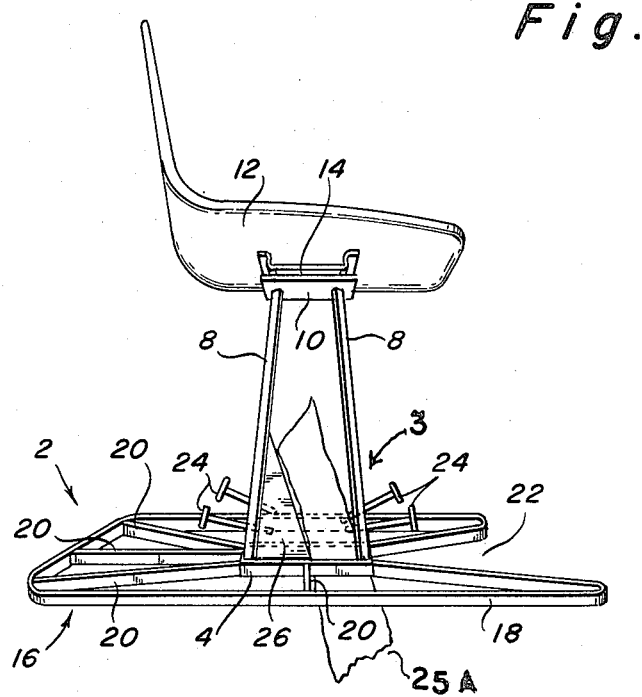
FIG. 3 is a view similar to FIG. 1, but showing the use of a wedge for maintaining the stand upright on an inclined stub.
Figure 4:
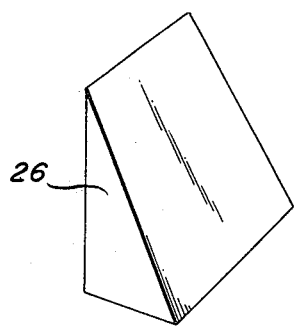
FIG. 4 illustrates a typical wedge usable as illustrates in FIG. 3.

Referring now to the drawings, in which like reference numerals denote similar elements, the deer stand 2 is comprised of a frame 3 having at its lower point a generally rectangular open square 4 to the corners 6 of which are respectively secured four upwardly convergent legs 8. The legs are secured at their tops to the underside of a plate 10 onto which a chair 12 is swiveled as at 14.

The frame thus forms a downwardly open socket which fits over s tree stump or stub member 25 or 25a. Surrounding three sides of frame 4 is a foot rest 16 formed of a generally U-shaped pipe 18 supported on frame 4 by outwardly extending arms 20. The foot rest provides an opening 22 at one side of the frame so that a hunter can climb up on to the chair without having to climb over the foot rest. Clamps 24 clamp the frame onto the upwardly extending stump or stub member 25 and if the latter is inclined from the vertical, a wedge 26 may be engaged between the stumb and the frame so that the latter may be vertically disposed.

In operation the hunter fits the frame over a tree stump or limb stub member 25 or 25A, tightening clamps 24, and climbs up onto the seat 12 through the open side 22 of the foot rest 16. If the tree member is inclined, as is member 25A, a wedge 26 may be used so that the stand may be clamped in an upright position.

I claim:

1. A tree-mounted deer stand for mounting over an upwardly disposed tree stump member, said stand comprising a frame having a downwardly-open socket, said frame including a lower portion adapted to substantially surround said member, legs extending upwardly from said lower portion, seat means mounted on upper ends of said legs, and a foot rest extending outwardly from the lower portion of the frame.

2. A tree-mounted deer stand as claimed in claim 1, said foot rest means surrounding three sides of the lower portion of the frame and leaving a fourth side open providing an access means whereby a hunter can climb up onto the seat means substantially unincumbered by the foot rest means.

3. A tree-mounted deer stand as claimed in claim 1, and clamp means on the frame for clamping the latter onto the tree stump.

4. A tree-mounted deer stand as claimed in claim 1, the seat means on the upper end of the legs including the swivel whereby the seat may be rotated 360°.

5. A tree-mounted deer stand as claimed in claim 1, and wedge means for engaging between the frame and the tree member whereby the stand may be vertically disposed on a member which is inclined from the vertical.

* * * * *

UNITED STATES PATENT AND TRADEMARK OFFICE
CERTIFICATE OF CORRECTION

PATENT NO. : 4,290,504
DATED : Sept. 22, 1981
INVENTOR(S) : Cary Cuba

It is certified that error appears in the above—identified patent and that said Letters Patent is hereby corrected as shown below:

In column 1, line 46, delete "illustrates",
insert --illustrated--.
In column 2, line 16, delete "stumb",
insert --stump--.

Signed and Sealed this

Second Day of March 1982

[SEAL]

*Attest:*

*Attesting Officer*

GERALD J. MOSSINGHOFF

*Commissioner of Patents and Trademarks*